6157½X
A. B. Quimby.
Steam Safety Valve.
Patented Oct. 1, 1830.
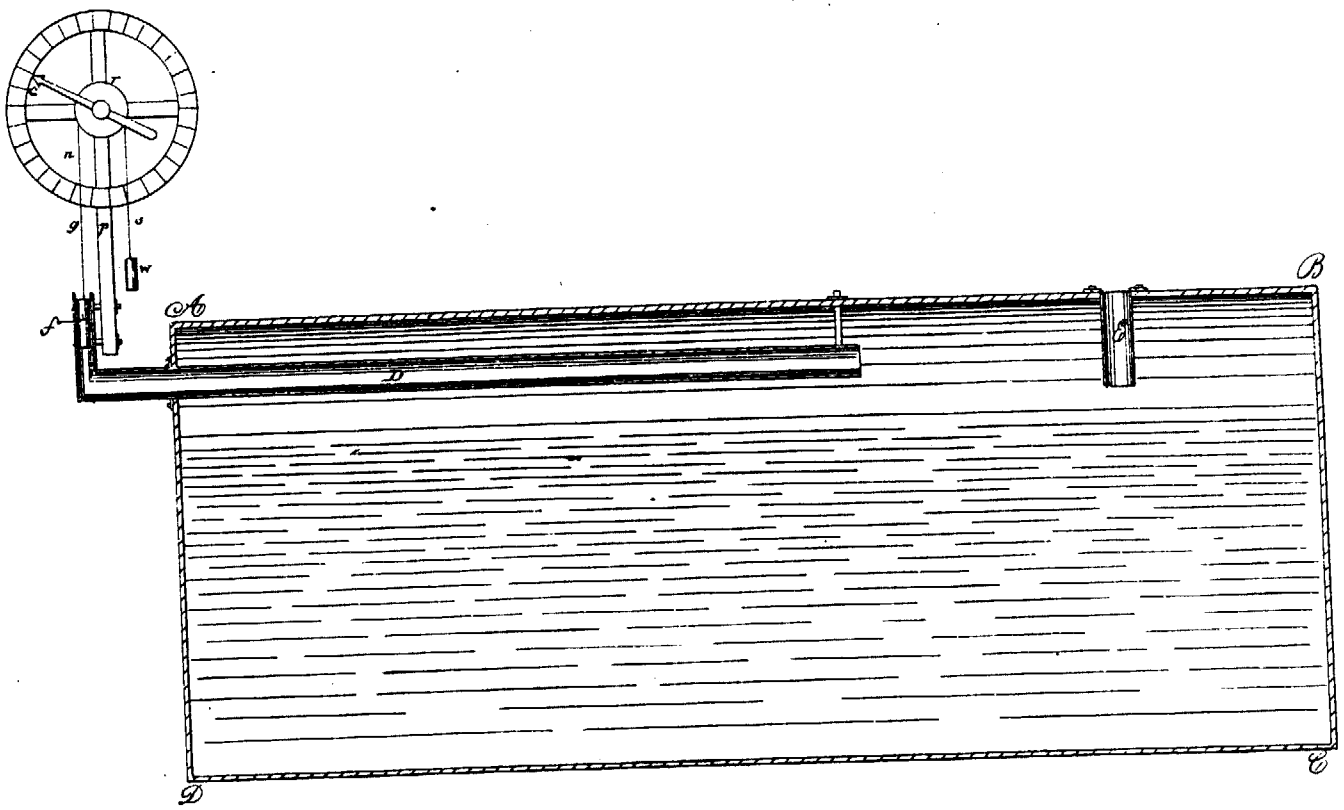
AM. PHOTO-LITHO. CO. N.Y. (OSBORNE'S PROCESS.)

A. B. Quimby
Letters Patent

The Schedule referred to in these Letters Patent and making part of the same containing a description in the words of the said A B Quimby himself of his improvement in the mode of preventing explosions in the boilers of Steam Engines To all whom it may concern Be it known that I A B Quimby have invented a mode of preventing explosions in the Boilers of Steam Engines by the application of the expansive force of mercury [illegible] or other fusible or fluid substance not only by indicating the temperature of the contained steam but also by causing it to open a valve for its escape or to sound an alarm and I do declare that the following is a full & exact description of the same. Within the boiler and near its upper part where it will be surrounded by steam I place a tube or reservoir of iron or other [illegible] material in which is contained the mercury or other fluid or fusible substance intended to operate by its expansion; mercury however I prefer to any other article. This tube or reservoir may be of various forms but the following I think the most convenient. An Iron tube 40 inches in length and 2½ inches in diameter within is fixed longitudinally with the Boiler, & is placed horizontally, one end of this tube is closed perfectly the other in the form of an elbow being bent at right angles, and is made to pass out thro' the top of the Boiler; the Bore in this vertical part being reduced in size say to about one fourth of an inch in diameter. A tube of this size will contain about 68 pounds of mercury which from the difference of the expansion between it and iron will when the reservoir is filled rise in the [illegible] tube to the height of about 1/5 of an inch with an increase of temperature equal to one degree of Fahrenheit's scale. These dimensions are only assigned for the purpose of exemplification but [illegible] will be subject to any variations which may be found convenient. Within the vertical tube I place a metallic float [illegible] [illegible] which will be made to rise by the expansion of the mercury. Sometimes I intend to allow this simply to float upon the
mercury, permitting it to slide easily within the tube, but in general
I design to surround it with a suitable packing in the manner of
ordinary pistons. From the top of it is to be extended a rod or stem
having upon it a toothed rack, a chain or other contrivance which
shall give motion to an index and indicate the temperature of the
mercury and consequently that of the steam.
When the piston or plunger rises to a certain height, resulting from
the highest temperature which it is thought safe for the steam
to acquire, the head of it is to be made to press against a lever
or other suitable contrivance which by being raised shall open
a valve and let off the steam. The arrangement of this part will
admit of an infinite number of variations, one of which is ex-
hibited in the drawing deposited in the Patent Office. When the steam
is let off, it may be either in large or in small quantities as may
be preferred. But it is my design in general to suffer it to escape
only in such quantity as being conducted into a trumpet formed
tube shall serve to give an alarm that the proper precautions may
be immediately taken by the Engineer.
As it is believed that an explosion never takes place until
the temperature of the steam is greater than it ought to be,
whether the quantity of water in the boiler be great or small
it is not thought necessary to accompany this invention with any other ap-
paratus for showing the height of the water. The object in view is to
obtain that information which shall be the means of guarding against
an explosion, whether the danger may arise from heating the water too
highly, or from what has been called surcharged steam, which is pro-
duced when the water is too low and consequently the steam is itself
exposed to the direct heating effect of the fire.
What I claim as my invention is my invention of the application
of the expansive force of mercury [illegible]
[illegible]
[illegible]

to a furnace or which shall allow the steam to escape and sound an alarm when the temperature is such as to produce danger, and this I claim whether the same be done by the arrangement which I have specified or by any other defendent upon the same principles.

Copy

Witnesses
Thos. P. Jones
And. H. Jackson

Aaron Balderston Quimby 884 words (Granted Octber 1. 1830)